INVENTORS:
Frank H. Adams
Joe M. Pharis

ATTORNEYS

United States Patent Office 3,733,261
Patented May 15, 1973

3,733,261
PROCESS FOR SEPARATING OLEFINS FROM SATURATED HYDROCARBONS
Frank H. Adams, La Grange Park, and Joe M. Pharis, Lockport, Ill., assignors to Universal Oil Products Company, Des Plaines, Ill.
Continuation-in-part of application Ser. No. 100,105, Dec. 21, 1970. This application Apr. 10, 1972, Ser. No. 242,456
Int. Cl. C07c 7/12
U.S. Cl. 208—310                                                          7 Claims

ABSTRACT OF THE DISCLOSURE

An improved process for separating olefinic hydrocarbons in high purity from a feed stream containing a mixture of olefinic and paraffinic type hydrocarbons along with contaminants including aromatic and non-normal type hydrocarbons. The general process operations include a contacting operation wherein an olefinic hydrocarbon is preferentially adsorbed by a selective adsorbent in an adsorption zone and subsequently contacted with a desorbent material in a desorption zone to effect the removal of preferentially adsorbed olefins from the adsorbent. The improvement resides in effecting the removal of product olefins from the adsorbent prior to contacting the adsorbent in the desorption zone with an increased concentration of desorbent to effect a second desorption of the more tenaciously held contaminant hydrocarbons. The improvement allows the process to rid the adsorbent of contaminants (aromatic and non-normal hydrocarbons) present on the adsorbent when attempting to separate olefinic hydrocarbons. This results in increased adsorbent capacity for olefinic hydrocarbons and improved olefinic extract purity relative to contaminants.

CROSS-REFERENCE TO RELATED APPLICATION

This application is a continuation-in-part application of our copending application Ser. No. 100,105, filed on Dec. 21, 1970, and now abandoned. All the teachings of said application are incorporated into this application by specific reference thereto.

BACKGROUND OF THE INVENTION

Field of the invention

The field of art to which this invention pertains is hydrocarbon separation. More specifically, this invention pertains to a countercurrent flow fixed bed type separation process in which an olefinic hydrocarbon is more selectively adsorbed from a feed stock containing predominantly saturates and olefins. The olefinic hydrocarbons are recovered by contacting the adsorbent with a desorbent in the desorption zone. Additionally, in said desorption zone, aromatic and non-normal hydrocarbons which are present in the feed stock as contaminants are also removed from the adsorbent and withdrawn through a separate extract removal stream.

Description of the prior art

Applicants recognize the abundance of prior art in the separation field especially that art relating to countercurrent fixed bed type operations which are commonly referred to as simulated counter-current flow fixed bed type operations and particularly exemplified in U.S. Pat. 2,985,589.

Typical of the prior art process are those involving the countercurrent contacting of a solid adsorbent and a fluid stream while maintaining a fixed bed of adsorbent. Operations are effected by a shifting of inlet and outlet streams throughout an adsorbent bed system to effect a countercurrent flow of fluid and the adsorbent. Improvements which have been recognized for these type processes include process flows including internal flush streams to flush the interstitial void spaces located between the adsorbent particles of any material which is not desired to be present in the stream which is to be recovered from the adsorbent in a subsequent desorption step. The prior art processes do not utilize flush streams to remove undesired adsorbed contaminants from the adsorbent. In instances where contaminant material is more tenaciously held upon the adsorbent than any of the other feed materials the capacity of the adsorbent is diminished to the extent that it adsorbs the contaminant. The prior art processes have not dealt with contaminants other than by regeneration or shutting down the process while applicants have recognized a method of altering the flow characteristics of a countercurrent flow fixed bed type adsorptive-separation unit to allow a controlled removal of a contaminant which is more tenaciously held by an adsorbent than the other feed components. Applicants have recognized that feed stocks which are used in the process of this invention generally contain dienes or aromatic hydrocarbons which fall within the boiling range of the feed stock used. These contaminants pass into the adsorptive-separation zone to take up capacity of the adsorbent because of their ability to be retained upon the adsorbent more tenaciously than the selectively adsorbed olefinic hydrocarbons.

Applicants improved process allows the contaminant material which is the most tenaciously held component of the feed to be removed in an easily controlled manner by employing a second extract stream which is removed from a desorption zone. This contaminant extract removal stream allows an adsorbent which has previously been contacted with a desorbent material and rendered extract free by withdrawal of the extract olefins to be contacted with relatively high concentration of desorbent material which removes the contaminant components of the feed stock from the adsorbent. This particular process scheme allows an adsorptive-separation process to effectively gain capacity where contaminants have been present in the feed stock.

BRIEF SUMMARY OF THE INVENTION

The invention can be summarized as an improved process for separating olefins which utilizes a contaminant withdrawal stream in a fixed simulated countercurrent flow-type process located between the extract withdrawal and desorbent inlet streams.

DESCRIPTION OF THE DRAWING

Reference is made to the attached figures which show schematic flow of the countercurrent operations of the present improved process and the prior art process.

FIG. 1

FIG. 1 shows four operational zones having interconnecting lines 1 and 7 with input and output streams 2, 3, 4 and 5. For purposes of simplification a solid adsorbent is presumed to be moving in a downward direction through line 1 through the various zones. For the purposes of this figure, a number of beds shall be considered to be located within each operational zone. In each zone distinct operations take place in order to allow the separation of the feed stock into an extract and raffinate streams which contain increased concentrations of selected components of the feed.

The claimed process can be effected by using a fixed bed column of adsorbent with the terminal beds connected by a pump around circuit which contains a fluid displacement means which induces a unidirectional flow of fluid through the entire series of beds. The direction of fluid flow through the series of beds is the same as the direction in which the input and output streams are shifted before the process is advanced to a new period in the cycle of operations.

Figure 1:
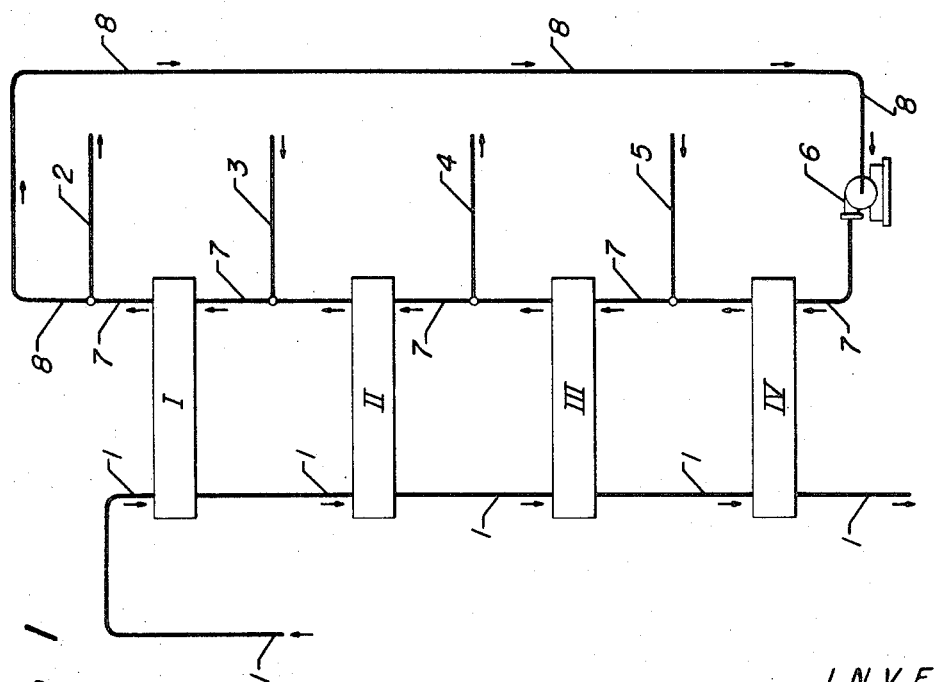

In FIG. 1 the adsorbent material is flowing in a downward direction through the zones and passing the various input and output streams as indicated. For all practical purposes, the operations taking place within the four operational zones are the same as would take place between the various input and output streams if they were shifted through the series of beds of adsorbent in a fixed bed process flow scheme. As shown in FIG. 1 and as would be present in a fixed bed flow scheme, operational zone I would be located between raffinate stream 2 and the feed stream 3; operational zone II would be located between feed stream 3 and extract stream 4, operational zone III would be located between extract stream 4 and desorbent stream 5, and operational zone IV would be located between desorbent stream 5 and a raffinate stream. In a moving bed operations and also in the fixed bed operations more than four of the operational zones may be utilized in a given separation unit. Typically a set of four operational zones can be stacked upon each other giving a continuous series of groups of operational zones.

In order to allow continuous operations to be effected with respect to the fluid flowing in the zone, a pump around circuit 8 is used. This as shown circuit contains a pumping device which induces flow of a portion of the raffinate material that would otherwise leave the process via raffinate line 2 from zone I to zone IV. The pump around circuit, when it is used in a system in which the adsorbent is stationary and the inlet and outlet streams are moving, carries different material as the operational zones are shifted.

The solid adsorbent leaving zone IV, via line 1 is recovered and reused by passing it directly to line 1 entering zone I. Reference can be made to Broughton, U.S. Pat. 3,274,099 (Cl. 208—310) for a further explanation of the moving bed scheme used in this illustration.

In the fixed bed type operations the normal sequence of operations would include the passing of feed and desorbent materials into the process with the removal of extract and raffinate streams from the process for a period of time to allow the compositions of the output streams to sufficiently change to indicate presence of an undesirable component in the respective output streams. The input and output streams are then shifted in the same direction and again material is allowed to flow into and out of the process. By closely regulating the individual flow rates into and out of the process together with pressure differences on the input and output streams, it is possible to continuously produce raffinate and extract streams having desired concentrations of the individual portions of the feed stock which are desired to be separated. The operations taking place within operational zone I of the moving bed scheme of FIG. 1 are essentially the adsorption of feed stock olefins and contaminants together with a portion of the feed stock saturated hydrocarbons. The adsorption of these components displaces desorbent material which is present within the selective sites within the adsorbent from its being previously contacted with a high concentration of relatively pure desorbent material in zone III.

The liquid material passing out of zone I via line 7 is essentially a mixture of desorbent and the saturate feedstock components and is typically referred to as a raffinate stream. The liquid passing into operational zone I via line 7 and feed line 3 is essentially a feed stock material.

Operational zone II is essentially a rectification zone in which the olefinic materials from the feed stock are concentrated upon the adsorptive sites within the adsorbent. The adsorbent passing into zone II contains olefins, and contaminants together with desorbent material and some raffinate material. The liquid passing into operational zone II via line 7 is essentially a part of the extract material and comprises a mixture of desorbent material and the olefinic materials present in the feed stock. The liquid stream passing into zone II removes any adsorbed saturate materials from the adsorbent because the saturates are less tenaciously held by the adsorbent than the olefins or desorbent. Any olefinic materials that are displaced from the adsorbent adsorptive sites by desorbent material are readsorbed within zone II as the liquid material passing through this zone passes in an upward direction. For all practical purposes the liquid passing out of zone II is essentially free of any olefin feed materials.

Zone III is essentially a desorption zone in which the olefinic materials present within the adsorbent are removed from the adsorbent by contacting with a concentration of a desorbent material which has the ability to displace the olefinic material from the adsorbent. The liquid material passing into zone III via lines 7 and 5 is essentially pure desorbent material which can readily displace the adsorbed olefins from the adsorbent. The liquid passing out of zone III is essentially an extract material which comprises the olefinic hydrocarbons of the feed stock and a desorbent material. A portion of the extract is diverted to zone II to help the rectification operations taking place in that zone. The solids passing into zone III via line 1 contain within their interstitial void spaces a desorbent and olefinic mixture which in most instances approaches the composition of the extract stream together with adsorbed olefin aromatic contaminants and a portion of adsorbed desorbent material. The solids passing out of zone III via line 1 contain essentially desorbent material within their interstitial voids together with contaminant materials and desorbent within the solid's adsorptive sites. In instances in which a desorbent material is used which can readily displace both feed olefins and the contaminants from the adsorbent, there would be a negligible amount of aromatic contaminants leaving zone III adsorbed upon the adsorbent. The contaminants would be present within the extract liquid stream leaving zone III and would contaminate the product.

The desorption of aromatic contaminants from the adsorbent material in zone III prevents the adsorbent from losing capacity because the aromatic materials take up a portion of the adsorbent's adsorptive capacity when they are allowed to remain upon the sieves. During normal operations the contaminants would eventually build up on the adsorbent to the extent that a high rate of adsorbent would be needed in order to allow a reasonable separation with a given throughput of feed materials. The aromatic contaminant build-up can be prevented by desorbing the aromatic contaminants in zone III allowing them to leave the process via the extract stream, but this degrades the purity of the extract stream which in many instances is not desired. The improvement of the process of this invention allows operation to take place without the problems of leaving aromatic contaminants upon the adsorbent and thereby reducing the adsorbent's capacity, and substantially eliminates contamination of the extract stream with aromatic contaminants. The improved method of the claimed process will describe the method utilized to achieve the above benefits.

The last zone, zone IV, is utilized to save on the quantity of desorbent material which is used in zone III. The sieves passing into zone IV contain desorbent and a portion of aromatic contaminant depending upon whether the aromatic contaminant passes out of the extract stream or is allowed to remain upon the sieves. The liquid material passing into zone IV via line 8 is essentially a raffinate composition and in order to reduce desorbent usage a portion of raffinate material passing out of zone I via line 7 is allowed to pass into zone IV via lines 7 and 8 to displace desorbent material from the interstitial void spaces between the adsorbent particles passing into zone IV. The desorbent material is thus displaced into zone III via line 7 and supplements the requirements of desorbent needed to effectively remove olefins from the adsorbent in zone III.

The above operations constitute the operations taking place in the four operational zones for the separation of olefins from saturate materials in a feed stock which contains contaminants. In order for continuous operations to take place the solids leaving zone IV via line 1 can be returned to zone I via line 1 in a recycle type operation or can be passed into another zone I located immediately below zone IV. In the fixed bed countercurrent operations, the continuous flow is established by connecting line 7 with a connecting conduit 8 having a pump 6 in line with the pump around conduit to induce a net flow through the series of zones. The simulated movement of solids is established by periodically advancing the feed, raffinate, extract and desorbent streams in direction that the pump around circuit induces flow within the process.

Reference can be made to Broughton, U.S. Pat. 2,985,589 (Cl. 210-34) and a paper entitled, "Continuous Adsorptive Processing—A New Separation Technique," by D. B. Broughton presented at the 34th Annular Meeting of the Society of Chemical Engineers at Tokyo, Japan on Apr. 2, 1969, for further explanation of the fixed bed countercurrent flow process scheme.

FIG. 2

Figure 2:
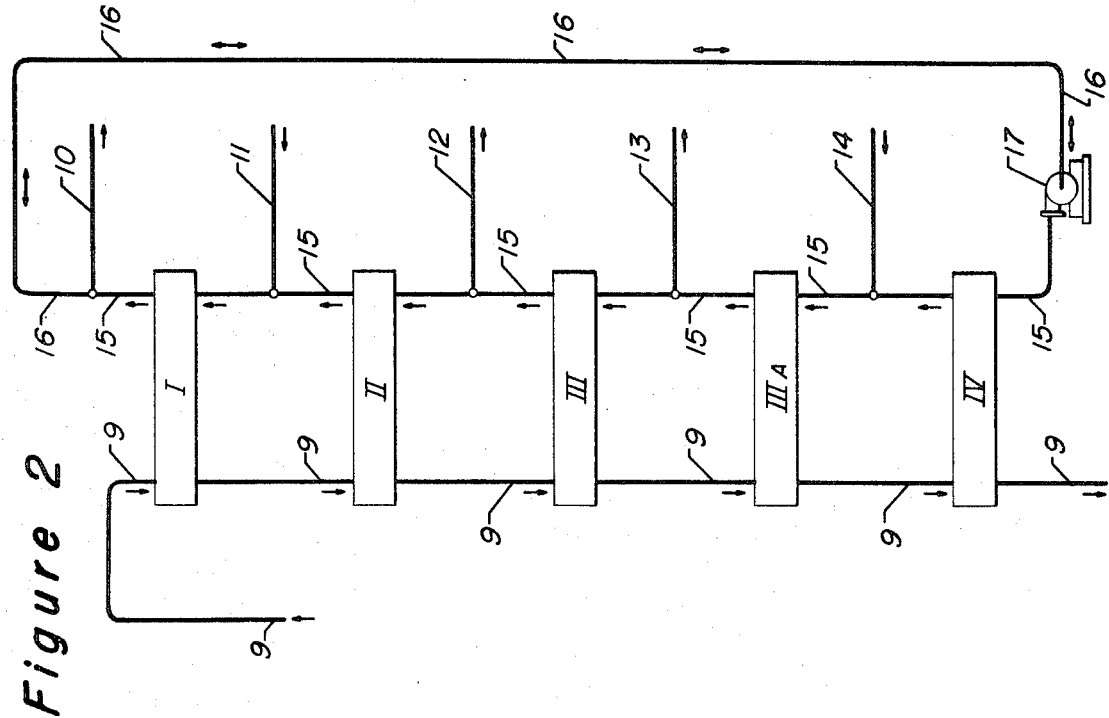
FIG. 1 shows the process contemplated by the prior art and FIG. 2 shows the improved flow scheme claimed herein. The claimed process relates a fixed bed countercurrent operation process in which a bed or plurality of beds of adsorbent are serially connected having input and output streams attached to the series of beds. The input and output streams are advanced in a single direction prior to a new period during a cycle of operations allowing a countercurrent flow of fluid with respect to the stationary solid material.

FIG. 2 illustrates the improved process. The solid adsorbent which is used in the improved process flows in a downward direction through line 9 passes through five individual operational zones which are indicated by zones I, II, III, III-A and IV. Overall liquid flow in the process is in an upward direction through line 15.

In order to maintain a continuous type operation with respect to the fluid a pump around circuit is utilized which is represented by conduit 16 which is attached to line 15 at zone I and at zone IV. The pump around circuit contains a fluid displacement means 17 which can be any type of pump which is known to the art. The continuous flow of fluid through the process is induced by the pump around circuit, the fluid entering zone I via line 15 which does not pass out of the process via raffinate line 10 passes into line 16 through pump 17 and back into zone IV via line 15. The pump around circuit may also induce flow from zone IV to zone I in other instances with the overall fluid flow in an upper direction. In order to maintain continuous operations with respect to the solid adsorbent the adsorbent which leaves zone IV at line 9 can be passed into zone I via line 9. The multiple stage operations can include a series of groups of five operational zones stacked one upon another. The solid adsorbent which passes through the groups of zones is eventually recycled to the top zone after completely passing through all the individual zones in the configuration. Reference can be made to Broughton U.S. Pat. 3,274,099 (Cl. 208-310) for a further explanation of the moving bed scheme.

In FIG. 2 a raffinate stream passes out of the process via line 10, a feed stream passes into the process via line 11, a product extract stream passes out of the process via line 12, a second extract stream referred to as a contaminant extract stream passes out of the process via line 13 and a desorbent stream passes into the process via line 14. By manipulating the flow rate of materials into and out of the process and maintaining certain pressure drops between the various input and output streams together with the continuous flow of solid adsorbent in a downward direction a continuous removal of concentrated feed stock components in the raffinate and extract streams can be effected. The five zones shown in FIG. 2 operate in some instances exactly the same as their counterpart described in FIG. 1. The sole exception is zone III-A which represents the improvement of the claimed invention. In zone III-A contaminant is removed from the adsorbent by a desorbent material allowing the contaminant material to be removed from the process via the contaminant extract stream represented by line 13.

Zone I operations are identical to the operations described for FIG. 1 which are essentially an adsorption of feed stock olefins and aromatic contaminants together with a portion of the feed stock saturate hydrocarbons. Zone II operations are identical to those described for FIG. 1 and are essentially a rectification type operation in which feed stock components are concentrated upon the adsorptive sites within the adsorbent.

The zone III operations are essentially desorption type operations in which the materials removed from the adsorbent within this zone are basically limited to feed stock olefins. The type of desorbent, its flow rate and the desorption conditions are regulated in order that a large portion or all of the olefin materials present in the adsorbent passing into zone III are removed from the adsorbent while the contaminants are allowed to remain upon the adsorbent as it passes out of zone III into zone III-A.

The essential operation taking place in zone III-A is a contaminant desorption operation. The adsorbent passing into zone III-A after having passed through zone III contains essentially desorbent material and contaminants located upon the adsorptive sites within the adsorbent. The liquid material passing into zone III-A via lines 14 and 15 is essentially pure desorbent material which can under certain conditions displace the aromatic and olefin contaminants. The liquid passing out of zone III-A is essentially a mixture of desorbent material and contaminants which are removed from the process via lines 15 and 13. The solids which then pass out of zone III-A into zone IV via line 9 contain essentially only desorbent material upon the adsorptive sites within the adsorbent. The addition of this second desorption zone prevents an aromatic contaminant build-up upon the adsorbent rendering its capacity substantially reduced after the build-up is allowed to exist for a long period of time, and prevents the product extract from being contaminated with aromatic contaminants.

In order for the improved operations to take place a desorbent must be selected and operating conditions must be controlled to allow a two-stage desorption to take place. It is preferred that a large quantity of desorbent be circulated through zone III-A to displace the contaminants from the adsorbent.

Relatively large quantities of desorbent may be used in the non-normal desorption section relative to that used in the olefin desorption section zone III. The total amount of desorbent used would be the same as in instances in which the improvement was not utilized. The primary reason for being able to desorb the aromatics in zone III-A is that they tend to be more tenaciously held by the adsorbent as compared to the olefins and that the olefins have been previously removed from the adsorbent in zone III. In zone III-A the only operation needed is the desorption of aromatics. Also the operations in zones III and III-A are such that the purest desorbent first contacts the adsorbent in zone III-A where the strongly held aromatics are adsorbed while the less pure desorbent removes the olefins from zone III. This is the ideal flow pattern for a two step desorption operation using countercurrent flow patterns.

The operations in zone IV are essentially the same as those described in FIG. 1 for zone IV.

In FIG. 2 and in a fixed bed countercurrent operation there is an overall net flow of fluid through the adsorbent. In the moving bed illustration the net flow of fluid is in an opposite direction to the downward passing solid adsorbent. In the fixed bed countercurrent process the net flow of fluid is in the same direction that the input and output streams advance when shifting to a new period of the cycle of operations.

In order for proper separation techniques to take place, the liquid flowing between zones is generally in the same direction. For instance, the liquid flow along line 15 between zone IV and III-A is in an upward direction (from zone IV to zone III-A), the liquid flow along line 15 between zone III-A and III is from zone III-A to zone III, the flow in line 15 between zones III and II is from zone III to zone II, and the flow of liquid between zones II and I along line 15 is from zone II to zone I. The only part of the process in which there is a choice of which direction the liquid shall flow between zones is in the line or lines which may connect zone I with zone IV. Raffinate material may be allowed to pass from zone I to zone IV via lines 15 and 16. In this case there would be a reduction in desorbent usage because the raffinate which passes into zone IV displaces desorbent material located between the interstitial void spaces between the adsorbent particles passing into zone IV.

If the flow between zones I and IV is allowed to be reversed with liquid flowing from zone IV to zone I the desorbent input rate via line 14 will increase since a part of the desorbent passing into the process via lines 14 and 15 will be diverted into zone IV rather than all of the desorbent passing into zone III-A. The advantage in using this type flow between zones I and IV is that raffinate type material is prevented from contaminating either the product extract or contaminant streams.

DETAILED DESCRIPTION OF THE INVENTION

It is an object of the present invention to present an improved separation process wherein tenaciously held contaminant materials present in feed streams which pass into an adsorptive separation zone are removed from an adsorbent by withdrawing these contaminants along with a portion of desorbent from a second extract removal stream in a desorption zone.

The particular contaminants which we are concerned with include certain aromatics of the benzene or alkyl-benzene nature, alkyl-indanes, or the indanes, bicyclic aromatics including naphthlenes, biphenyl, or the acenaphthenes. The above mentioned aromatic contaminants can be generaly characterized as having the general formula of $C_nH_{2n-J}$, where J as used in the mass spectrometer art, indicates a specific number which when supplied in the above mentioned empirical formula can allow distinctive separation of complicated aromatic types. We have found that certain $J_6$ and $J_{12}$ aromatic hydrocarbons are those which are most strongly held on the adsorbent. Other types of aromatic hydrocarbons such as the $J_8$ or $J_{10}$ or even $J_{16}$ type hydrocarbons would also present a somewhat similar situation. Additional contaminants include cyclo-olefins and di-olefins both of which are more tenaciously held by the adsorbent than the mono-olefins in the feed. Preferred feed stocks which can be used in the process of this invention include those streams having mono-olefinic concentrations of from about 1% to about 25% although higher concentrations of olefins may be present in a feed stock which has previously been passed through an olefinic concentration process. The feed stocks used in the process of this invention are for the most part straight-chain hydrocarbon type materials.

The normal hydrocarbons are utilized so that the concentrated olefins from this process may be used for the production of biodegradable detergents. Typically, the feed streams have a carbon number range of from about 6 carbon atoms per molecule to about 22 carbon atoms per molecule. The olefins are generally present with normal paraffins having about the same carbon number separate and in addition the feed stock may contain minor portions of aromatic and multiple olefinic type hydrocarbons. The contaminants have been found in adsorptive separation operations, in which a crystalline aluminosilicate adsorbent is used, to be harmful to the process in that they can substantially reduce the capacity of the adsorbent for the mono-olefinic hydrocarbons which are desired to be adsorbed.

Various methods of pre-treatment of the feed stock have been used in attempting to remove all or a portion of the contaminants. These methods have included acid washing or contacting the feed stock in a pretreatment zone containing an adsorbent which will remove the contaminants. The present improved process allows these contaminants to be passed into the process in relatively small concentrations without undue loss in adsorbent capacity.

The basic inventive concept of this process resides in providing an olefinic separation process in which countercurrent flow type operations take place by causing contaminant hydrocarbon extract stream to be withdrawn from the process in a manner hereinafter described.

In order to appreciate the benefits afforded by the improved process disclosed here, a brief description of the basic process flow consists of what is typically referred to as countercurrent staged operations. The countercurrent flow is shown by the passage of the adsorbent and a hydrocarbon fluid in opposite directions in the overall flow of this process.

It is generally necessary that the adsorbent be stationary while effecting the present process flow in order to eliminate undue adsorbent attrition.

The adsorbent may be used in various forms. The best results achieved when using small particle size, preferably from about 20 through 40 mesh particle size as measured by standard screening techniques. The relatively small adsorbent size prevents channeling of fluid through the adsorbent bed and, to an extent, does help to reduce void volume between the particles while in many cases increasing the surface area of the adsorbent particles.

The desorbents which can be used in this process include olefinic type hydrocarbons which boil at temperatures sufficiently different than the boiling temperature of the feed stock. Both branched or straight chain mono-olefins can be used as desorbents. Additionally aromatic type hydrocarbons may be used as desorbents. In some instances it will be advantageous to employ desorbents which contain a mixture of iso-olefins and normal or iso-paraffins in a ratio which allows the selectively retained component of the feed to be desorbed from the adsorbent when using a particular desorbent. Typical desorbents which can be used for a feed stock containing $C_{10}$ through $C_{14}$ mono-olefins is a desorbent mixture comprising about 80 vol. percent octene-1 and 20 vol. percent iso-octane. In instances in which lower molecular weight feed stocks are used a lower molecular weight desorbent mixture can be used. An example of a desorbent which can be used when $C_6$ through $C_9$ feed stock is employed is a desorbent containing about 80% of a straight chained butylene and about 20 vol. percent of normal butane.

Operating conditions for both adsorption and desorption to the mono-olefins in the feed stock passed into the process can include both vapor and liquid phase operations. The liquid operations are generally preferred because of the resulting lower temperature requirements which reduce the opportunity for side reactions to occur. The side reactions generally consist of polymerization of the olefins present in the feed stock while they are in contact with the adsorbent.

Operating conditions can include temperatures within the range of from about 25° C. to about 225° C. and pressures within the range of from about atmospheric to about 750 p.s.i.g. Since the operations of the present process include a basic adsorption and desorption step it is possible that the temperature or pressure or both may be varied for the individual adsorption or desorption operations taking place in the process.

The adsorbents which can be used in the process include the Type X or Type Y structured crystalline aluminosilicates or the naturally occurring faujasite species. The Type X zeolite is described in U.S. Pat. 2,882,244 while the Type Y zeolite is described in U.S. Pat. 3,130,007. The adsorbents as described above can contain cations selected from the group consisting of alkali metals (Group I-A), the alkali-earth metals (Group II-A), the coinage metals (Group I-B), or the Group II-B metals. Preferred metals selected from the aforementioned group include lithium, sodium, potassium, magnesium, calcium, strontium, barium, copper, silver, gold, zinc, cadmium, and mercury. Additionally, combinations of the above mentioned metals may be included to enhance the adsorbent's selectively for the olefins and to help reduce the harmful effects of side reactions including polymerization.

EXAMPLE I

In this example various adsorbents were used to determine the relative selectivity of each adsorbent for aromatic hydrocarbons as compared to olefinic type hydrocarbons. The testing conditions include 100° C. temperature and sufficient pressure to maintain steady liquid phase operations. The feed stocks used consisted of 0.5 vol. percent of di-isopropylbenzene, 10.0 vol. percent decene-1 and 89.5 vol. percent iso-octane, or 0.1 vol. percent naphthalenes, 10.0 vol. percent decene and 89.9 vol percent iso-octane. These concentrations of aromatics were chosen because they occur in many olefinic feed streams in these relative concentrations.

The tests were carried out as follows. The sieves were initially contacted with the blend containing the decene-1 and the aromatic until equilibrium between the adsorbed and external liquid phases was reached. The adsorbed olefin and aromatic were then displaced by passing a mixture of 5 vol. percent isopentane with 95 vol. percent of octene-1 over the sieves. The isopentane was used as a tracer to help determine the breakthrough of the octene-1 as measured by a chromatograph.

These were three types of adsorbents which were tested. All the adsorbents were type Y structured crystalline aluminosilicates. Adsorbent Na-Y was a sodium form, adsorbent K-Y was a totally potassium exchanged sodium zeolite and adsorbent Ag-Y was a partially silver exchanged sodium zeolite which contained about 7.8 wt. percent silver.

In order to fully understand the results of this example the selectivity of an adsorbent is defined. The term selectivity when referring to adsorptive-separation refers to the ratio of the concentrations of two components present within the adsorbent and externally surrounding the adsorbent. More specifically, the selectivity can be defined as expressed in Equation 1 below:

$$B_{x/y} = \frac{\left(\frac{X}{Y}\right)_a}{\left(\frac{X}{Y}\right)_u} \quad (1)$$

wherein B is the selectivity, $x$ and $y$ are the components whose selectivities are being compared, the quantity $(X/Y)_a$ represents the ratio of the volumetric concentrations of the components $x$ and $y$ which are adsorbed within the adsorbent, the quantity $(X/Y)_u$ represents the ratio of the volumetric concentrations of the components $x$ and $y$ which are present in the external phase surrounding the adsorbent. The selectivity of the adsorbent is measured at what is considered to be equilibrium conditions which require that there be no net transfer of materials between the adsorbed and unadsorbed phases when the selectivity is measured. The equilibrium conditions are most easily achieved by passage of a known composition containing the two components, which are to be compared in selectivities, through a bed of the selected molecular sieve adsorbent and continuing passage of the feed stream through the molecular sieve adsorbent bed until the composition of the material passing out of the adsorbent bed is substantially identical to the composition of feed material passing into the adsorbent bed. Both the feed and effluent streams having the same composition, a state of equilibrium conditions is achieved and there is no net flow between the adsorbed and external phases of the two components. After equilibrium conditions have been reached, the feed or external stream is drawn off from the adsorbent and a desorbent material is then passed through the adsorbent bed to displace essentially all the adsorbent material present within the crystalline aluminosilicate adsorbent. By employing suitable chromatographic equipment to monitor the effluent stream composition and knowing the rates of the material passing into the molecular sieve adsorbent bed, it is possible to determine the composition and quantity of the material that was adsorbed by the adsorbent. Upon determination of the composition of the adsorbed material present within the adsorbent and knowing the composition of the feed stream when equilibrium conditions were achieved, it is possible to determine the selectivity as defined in Equation 1.

In referring to Equation 1 above, a selectivity greater than unity is an indication of selective adsorption by the adsorbent of component $x$ while a seelctivity less than unity would indicate a preference of the adsorbent for adsorbing component $y$. Selectivities approaching unity indicate that there is no preference by the adsorbent being tested for either of the two components being measured for relative selectivity.

The selectivities for the adsorbent tested in Example I are shown in Table I below.

TABLE I
[Selectivity of aromatic with respect to decent -1

| Adsorbent | Aromatic tested | Selectivity, B aromatic/ decene-1 |
|---|---|---|
| Na-Y | Naphthalene | 625 |
| Na-Y | Diisopropylbenzene | 68 |
| Ag-Y | Naphthalene | 650 |
| Ag-Y | Diisopropylbenzene | 8 |
| Ag-Y | -Methylnaphthalene | 224 |
| K-Y | Naphthalene | 824 |
| K-Y | Diisopropylbenzene | 96 |

As can be seen from the above data the aromatics tested on the various desorbents varied to a large extent in selectivity but in all cases were more strongly held on the adsorbent. The other cations which previously have been disclosed would also give similar results as would the type X structured zeolites.

EXAMPLE II

A $C_{11}$ through $C_{14}$ dehydrogenation reactor effluent was used as a feed in a series of separation experiments used to verify the ability of a selected adsorbent to selectively adsorb olefins from a feed stock containing paraffins, olefins and contaminants. The feed stock composition is shown in Table II below.

TABLE II.—FEED STOCK ANALYSIS

| GLC | Weight percent | GLC | Volume percent |
|---|---|---|---|
| n-$C_{10}$ paraffin | 0.1 | Total olefins | 9.8 |
| n-$C_{11}$ paraffin | 24.9 | Light ends | 0.2 |
| n-$C_{11}$ olefin | 1.8 | Total paraffins | 86.5 |
| n-$C_{12}$ paraffin | 27.8 | Total non-normals | 3.5 |
| n-$C_{12}$ olefin | 2.6 | | |
| n-$C_{13}$ paraffin | 22.6 | | |
| n-$C_{13}$ olefin | 2.7 | | |
| n-$C_{14}$ paraffin | 12.1 | | |
| n-$C_{14}$ olefin | 1.7 | | |
| $C_{15}$ paraffin | 0.4 | | |
| | | M.S. | Weight percent |
| Total normal olefin | 8.8 | Aromatics | 0.35 |
| Total normal paraffin | 87.9 | Di-olefins | 0.95 |
| Total non-normals | 3.3 | Mono-olefins | 10.65 |

The dehydrogenation reactor effluent was passed through a bed of 320 cc. of a selected type Y adsorbent at a pressure of 300 p.s.i.g. and a liquid hourly space velocity of 2.8. After the adsorbent appeared to be fully loaded with the olefins and contaminants from the dehydrogenation reactor effluent, a flush stream of iso- and normal pentane was passed through the adsorbent bed to flush away paraffins remaining in the interstitial voids between the adsorbent particles. After the paraffins from the dehydrogenation reactor effluent were removed, a desorbent stream was passed through the adsorbent bed to remove the selectively sorbed olefins and aromatics. The recovered mixture which comprised desorbent and the selectively adsorbed olefins and aromatics was fractionated to remove the desorbent material. The remaining olefinic extract material was analyzed using chromatographic methods.

Five individual tests were run using the feed stock of Table II and the same general procedures described above. The operating conditions for the individual tests are summarized below:

Test A: A sodium form type Y zeolite adsorbent which was calcined for 2 hours at 450° C was used. The adsorption and desorption operations were carried out at 300 p.s.i.g. and 150° C. The desorbent material which was used to displace the adsorbed olefins and aromatics was essentially 100% octene-1.

Test B: The adsorbent employed in this test was a silver-exchanged type Y structured zeolite which after drying at 450° C. for 2 hours, contained about 9.85 wt. percent silver, as the element. Adsorption and desorption operations were effected at 300 p.s.i.g. and Test C: Same as Test B except a 100 vol. percent octene-1 desorbent was used.

Tests D and E: The adsorbent was a silver exchanged type Y structured zeolite which contained about 8.5 wt. percent silver after drying for 2 hours at 450° C. Adsorption and desorption conditions were effected at 300 p.s.i.g. and 100° C. A two-step desorption was employed using a first desorbent of about 100 vol. percent octene-1 followed by a second desorbent of 1.5 vol. percent octene-1 in iso-octane.

The results of the above five tests are shown in Table III following.

TABLE III.—OLEFINIC EXTRACT ANALYSIS

| | Test | | | | |
|---|---|---|---|---|---|
| | A | B | C | D | E |
| Total vol. of feed passed through absorbent bed, cc. | 2,595 | 2,270 | 2,439 | 1,977 | 1,970 |
| Purity of olefinic material recovered[1], vol. percent | 17.7 | 96.8 | 95.6 | 97.8 | 98.4 |
| GLC analysis, vol. percent: | | | | | |
| $C_{10-}$ | Trace | 3.0 | 0.1 | 0.1 | Trace |
| n-$C_{10}$ paraffins | | Trace | | 0.2 | 0.1 |
| n-$C_{10}$ mono-olefins | | 2.8 | 1.3 | 5.6 | 1.6 |
| n-$C_{11}$ paraffins | 4.6 | 0.9 | 0.8 | 0.2 | 0.3 |
| n-$C_{11}$ mono-olefins | 0.5 | 23.7 | 17.5 | 23.4 | 23.3 |
| n-$C_{12}$ paraffins | 31.9 | 1.0 | 1.0 | 0.2 | 0.4 |
| n-$C_{12}$ mono-olefins | 5.8 | 31.6 | 29.0 | 28.6 | 30.4 |
| n-$C_{13}$ paraffins | 29.0 | 0.8 | 1.1 | 0.2 | 0.3 |
| n-$C_{13}$ mono-olefins | 7.1 | 25.2 | 27.4 | 23.9 | 25.1 |
| n-$C_{14}$ paraffins | 14.7 | 0.4 | 1.3 | 0.4 | 0.5 |
| n-$C_{14}$ mono-olefins | 4.0 | 9.6 | 14.8 | 11.3 | 12.6 |
| n-$C_{15}$ paraffins | 0.7 | | | | |
| $C_{15}^+$ | 1.7 | 1.0 | 5.7 | 5.9 | 5.4 |
| | Test B | | | Test E | |
| MS analysis of $C_{15}^+$, vol. percent: Olefins and paraffins | 95.0 | | | 85.0 | |
| Aromatic types: | | | | | |
| Benzene or alkylbenzenes | 4.4 | | | 9.9 | |
| Indanes or tetralins | 0.5 | | | 3.3 | |
| Indenes or dihydronaphthalenes | Trace | | | 0.7 | |
| Naphthalenes | Trace | | | 1.1 | |
| Total aromatics | 4.9 | | | 15.0 | |

[1] Based on $C_{10}$ through $C_{15}$ extract material recovered after separation from desorbent material.

NOTE: Tests B and E were the only two tests in which the $C_{15}^+$ material was analyzed.

As can be concluded from the above data, most of the aromatic contaminants which were present in the feed stock were present in the adsorbed material which was recovered from the adsorbent during the desorption operations. This prevents an aromatic build-up on the adsorbent but does not eliminate contamination of product extract with the aromatic contaminants. If a desorbent was selected which did not desorb the aromatic contaminants from the adsorbent there would be no problem of product extract contamination, but the adsorbent's capacity would be reduced by the presence of the aromatic on the adsorptive sites within the adsorbent resulting in a reduction in the process efficiency.

In the process claimed herein, zones III and III–A of FIG. 2 can effectively in combination remove contaminant aromatics from the adsorbent without unduly contaminating the product extract stream with the aromatic contaminants. It is presumed that the totally desorbent requirement for desorption would not be increased by utilizing the improvement of this process.

EXAMPLE III

The following example is an illustrative embodiment of the claimed process.

About 7961 lbs. of a type Y structured crystalline aluminosilicate which had been essentially potassium exchanged was placed in a fixed bed apparatus having 24 separate serially connected beds. Each bed was approximately 3.46 ft. in diameter and 0.845 ft. in length and contained about 332 lbs. of the adsorbent.

There was a total of five input and output streams (fresh feed, raffinate, desorbent, contaminant extract and product extract) which were connected to the apparatus between the separate beds.

Starting with the fresh feed stream and proceeding in the direction of fluid flow as induced by the pump around circuit, there were 7 beds between the feed and raffinate streams (zone I). There were 3 beds between the raffinate and desorbent streams (zone IV); 3 beds between the desorbent and contaminant extract streams (zone III–A); 4 beds between the contaminant extract and product extract streams (zone III); and 7 beds between the product extract and feed streams (zone II).

Between each adsorbent bed there was a connecting line which during a complete cycle of operations carried all five of the input and output lines during the individual periods of operation which made up the entire cycle of operations.

The input and output streams were directed to the various connecting lines by using a manifold arrangement of valves and flow conduits which allowed the input and output streams to be simultaneously shifted through the series of beds in a single direction after a period of operations of the cycle had been completed and before a new period of operations was to begin. The shifting of the input and output streams in a single direction caused the separate operations taking place in the zones between the input and output streams described in FIG. 2 to also shift. This shifting enabled countercurrent flow of fluid and solids to take place in a stationary bed of adsorbent. A pump around circuit was utilized to connect the terminal ends of the serially connected beds. The pump around circuit contained a pump which caused fluid to flow from one of the terminal beds to the other terminal bed in the same direction as the input and output streams were shifted. This allowed continuous operations to take place.

The entire apparatus and the input streams were maintained at about 200° F. and 50 p.s.i.g. The input and output streams were shifted 24 times for an entire cycle of operations to take place. Each of the 24 periods making up the cycle lasted about 1.875 minutes with the entire cycle lasting about 45 minutes.

An effluent from a dehydrogenation plant was used as the feed stock for the improved process. An inspection of this material is shown in Table IV below:

TABLE IV

Feed stock analysis

| Component: | Wt. percent |
|---|---|
| $C_6$ paraffins | 27.12 |
| $C_7$ paraffins | 27.52 |
| $C_8$ paraffins | 20.03 |
| $C_9$ paraffins | 14.92 |
| Cycloparaffins | 0.42 |
| Iso-paraffins | 0.93 |
| Aromatics | 1.05 |
| $C_6$ mono-olefins | 1.77 |
| $C_7$ mono-olefins | 2.10 |
| $C_8$ mono-olefins | 2.00 |
| $C_9$ mono-olefins | 1.79 |
| Cycloolefins | 0.01 |
| Isomono-olefins | 0.06 |
| Diolefins | 0.28 |
| | 100.00 |

The desorbent which was used was a mixture of 20 vol. percent n-butane and 80 vol. percent n-butylene which could desorb the product olefins and contaminant aromatics and olefins from the adsorbent. Because of the effects of the adsorbent and the feed stock materials on the desorbent's degree of adsorption up on the adsorbent there was a tendency for the olefinic portion of the desorbent to concentrate in the raffinate stream. Since the desorbent material was easily separated from the feed stock components in the raffinate and extract streams, it could be recovered and reused in the process. The flow rates of feed stock passing into the process was about 240.5 barrels/day at 60° F.; the desorbent flow rate into the process was about 249.4 barrels/day at 60° F.; the raffinate leaving the process amounted to about 380.2 barrels/day at 60° F.; and the total product and contaminant extract wthdrawn from the process amounted to about 109.8 barrels/day at 60° F. The compositions of the extract and raffinate streams are shown in Table V below.

TABLE V

| Components | Volume (percent) | Quantity at 60° F., bbl./day |
|---|---|---|
| Raffinate: | | |
| Mono-olefins | 0.5 | 1.8 |
| Normal cyclo and isoparaffins | 58.0 | 220.7 |
| Desorbent material | 41.5 | 157.6 |
| Product extract: | | |
| Mono-olefins | 15.0 | 14.6 |
| Aromatics, di-olefins, cyclo-olefins | 0.4 | 0.4 |
| Desorbent material | 84.6 | 82.7 |
| Contaminant extract: | | |
| Mono-olefins | 13.2 | 1.6 |
| Aromatics, di-olefins, cyclo-olefins | 11.6 | 1.4 |
| Desorbent material | 75.2 | 9. |

As can be seen from the above data the product extract stream after removal of desorbent therefrom had a 97.4 vol. percent concentration of olefins with the remaining 2.6 vol. percent of the extract material containing essentially the strongly feed aromatics, di-olefins and cycloolefins which were considered contaminant materials. The contaminant extract stream, after the desorbent material was removed, contained 53.3 vol. percent mono-olefins and 46.7 vol percent of contaminant materials (aromatics, di-olefins and cyclo-olefins).

An embodiment resides in a fixed-bed simulated countercurrent flow type process in which an elongated column of an adsorbent is used to separate mono-olefinic hydrocarbons and contaminant aromatic hydrocarbons from a feed stream containing olefinic hydrocarbons, contaminant aromatic hydrocarbons and saturated hydrocarbons by a manipulation of a feed inlet stream, a product extract outlet stream, a contaminant extract outlet stream, a desorbent inlet stream and a raffinate outlet stream in a manner which effects countercurrent flow of solid adsorbent particles with respect to fluid present within the elongated column of adsorbent.

We claim as our invention:

1. In a fixed bed simulated countercurrent flow process in which an elongated column of a selected adsorbent is used to separate mono-olefinic hydrocarbons from saturated hydrocarbons present in a feed stock, which contains a quantity of aromatic contaminants, by periodically shifting in a single direction through said column of adsorbent a feed inlet stream, an extract olefin outlet stream, a desorbent inlet stream and a raffinate outlet stream respectively while controlling the flow rates of material through said streams in a manner to effect (1) the adsorption of olefins and contaminants by the adsorbent located between said feed inlet and raffinate outlet streams, (2) the desorption of olefins from the adsorbent located between the extract olefin and desorbent inlet streams, and (3) the flushing of saturates adsorbed by said adsorbent from said adsorbent located between the feed inlet and extract olefin outlet streams, Wherein an improvement which comprises, withdrawing an extract contaminant outlet stream containing said aromatic contaminants and a portion of said desorbent from said column of adsorbent at a location between said extract olefin outlet stream and said desorbent inlet stream.

2. The process of claim 1 further characterized in that said feed stock contains mono-olefins and paraffins having from about 6 to about 20 carbon atoms per molecule.

3. The process of claim 1 further characterized in that said adsorbent is selected from the group consisting of type X or type Y structured zeolites.

4. The process of claim 3 further characterized in that said adsorbent contains at least one cation selected from the group consisting of the Group I-A, Group I-B and Group II-B metals or combinations thereof.

5. The process of claim 1 further characterized in that said raffinate stream contains saturates and desorbent material.

6. The process of claim 1 further characterized in that said extract olefin outlet stream contains desorbent and mono-olefins.

7. The process of claim 1 further characterized in that said desorbent material is selected from the group consisting of normal olefins, normal paraffins, isoparaffins, aromatic hydrocarbons and mixtures thereof having a substantially different boiling point than the olefins contained in said feed stock.

References Cited

UNITED STATES PATENTS

| 2,646,451 | 7/1953 | Rommel | 208—310 |
| 3,205,166 | 9/1965 | Ludlow et al. | 208—310 |
| 3,274,099 | 9/1966 | Broughton | 208—310 |
| 3,510,423 | 5/1970 | Neuzil et al. | 208—310 |

HERBERT LEVINE, Primary Examiner

U.S. Cl. X.R.

260—677 AD